United States Patent [19]

Kurakake

[11] 4,338,659

[45] Jul. 6, 1982

[54] POSITION CONTROL SYSTEM FOR A CLOSED LOOP TYPE NUMERICAL-CONTROLLED MACHINE TOOL

[75] Inventor: Mitsuo Kurakake, Kokubunji, Japan

[73] Assignee: Fujitsu Fanuc Ltd., Tokyo, Japan

[21] Appl. No.: 102,864

[22] Filed: Dec. 12, 1979

[30] Foreign Application Priority Data

Dec. 15, 1978 [JP] Japan ........................ 53-156692
Jan. 31, 1979 [JP] Japan ........................ 54-10227
Feb. 14, 1979 [JP] Japan ........................ 54-15905
Feb. 14, 1979 [JP] Japan ........................ 54-15906

[51] Int. Cl.³ .................. G05B 13/04; G05B 17/02
[52] U.S. Cl. .................................... 364/170; 318/561;
364/474; 364/150; 364/151; 364/176
[58] Field of Search ............ 364/105, 106, 474, 118;
318/561, 620, 621, 632, 611, 563

[56] References Cited

U.S. PATENT DOCUMENTS

| | | | |
|---|---|---|---|
| 3,767,900 | 10/1973 | Chao et al. | 364/106 |
| 3,795,799 | 3/1974 | Courtiol | 364/106 |
| 3,876,871 | 4/1975 | Sinner | 364/106 |
| 4,054,780 | 10/1977 | Bartley | 364/106 |
| 4,214,301 | 7/1980 | Kurihara et al. | 364/106 X |

Primary Examiner—Joseph F. Ruggiero
Attorney, Agent, or Firm—Staas & Halsey

[57] ABSTRACT

In a closed loop type numerical-controlled machine tool in which position control of a mechanical moving part is performed in accordance with a position error variable obtained by making a comparison between commanded positional information and detected positional information from a position detector mounted on the mechanical moving part, deteriorated performance resulting from the inclusion of the mechanical moving part in the closed loop is improved by using correcting means incorporated in the numerical-controlled machine tool.

13 Claims, 24 Drawing Figures

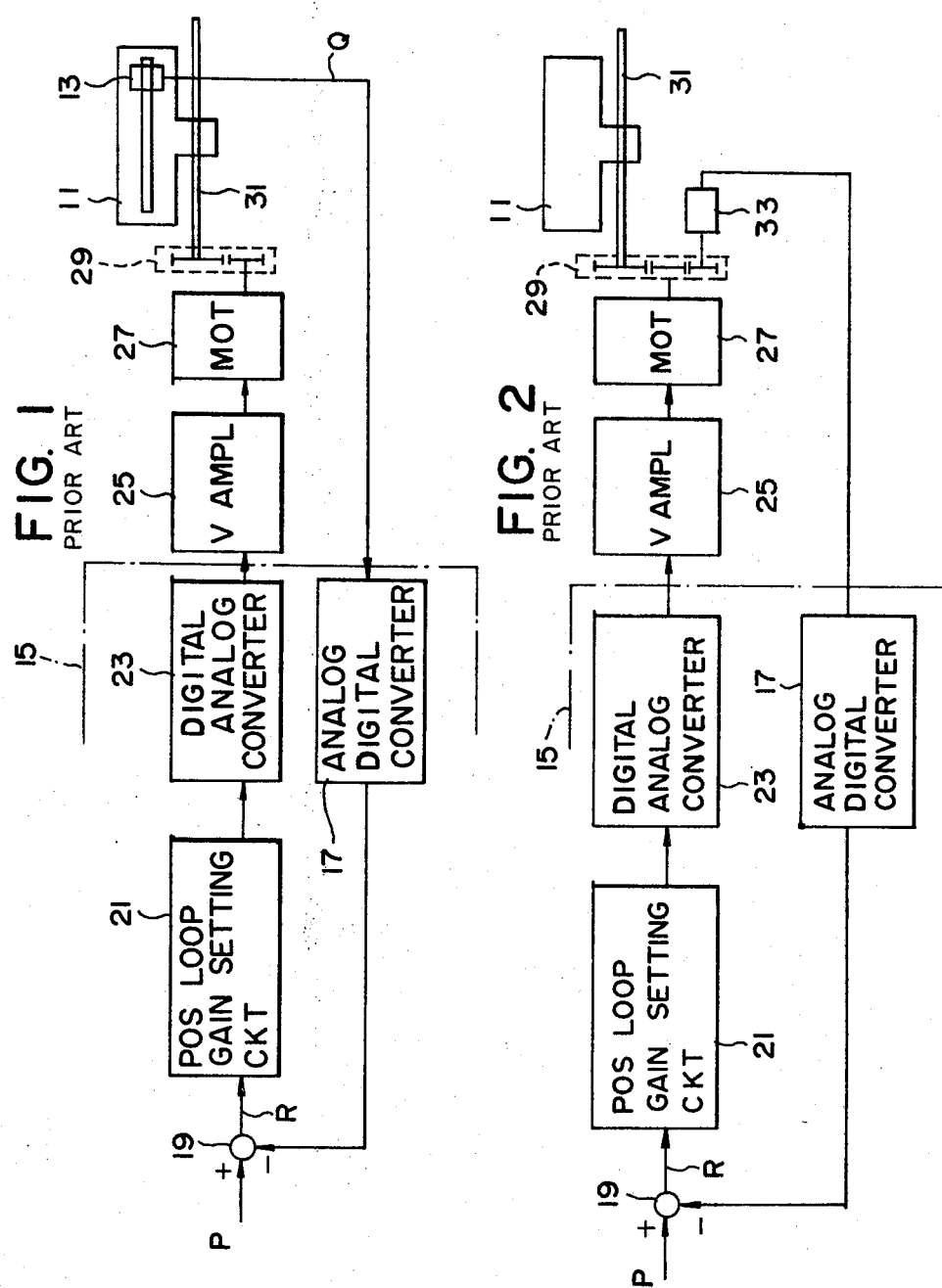

POSITION CONTROL SYSTEM FOR A CLOSED LOOP TYPE NUMERICAL-CONTROLLED MACHINE TOOL

BACKGROUND OF THE INVENTION

1. Field of the Invention

This invention relates to a position control system which ensures accurate and stable position control of numerical-controlled machine tools.

2. Description of the Prior Art

Position control systems for numerical-controlled machines tools may be divided into systems of the type employing a closed loop servomechanism such, for example as shown in FIG. 1, and systems of the type using a semi-closed loop servo-mechanism such, for example, as shown in FIG. 2. In the closed loop system, a position detector 13 such as an inductosyn or the like is mounted on a moving part of a machine tool which is to be controlled, for example, a moving table 11, and detected positional information Q from the position detector 13 is negatively fed back to the side of a position controller 15 of a numerical control unit and provided via an A-D converter 17 to an adder 19, wherein commanded positional information P and the abovesaid detected positional information Q are compared to obtain a position error variable R. The position error variable R is applied via a position loop gain setting circuit 21 and a D-A converter 23 to a velocity amplifier 25 to cause it to drive a motor 27 so that the position error variable R is reduced to zero, driving a reduction gear 29 and a ball screw 31 to perform position control of the moving table 11. In the semi-closed loop system, the position of the moving part to be ultimately controlled is not detected directly, but instead an indirect position, for example, the rotational angle of a motor shaft, is detected by a resolver or like detector 33 and negatively fed back so that it may coincide with the commanded positional information P.

FIGS. 3 and 4 show, by way of example, block diagrams respectively corresponding to FIGS. 1 and 2, indicating a position loop gain K; a transfer function $G_1(s)$ of a velocity controller including the characteristics of the velocity amplifier 25 and the motor 27; a transfer function $G_2(s)$ of the mechanical system including the characteristics of the reduction gear 29, the ball screw 31 and the moving table 11, including the break angular frequencies; $\omega_V$ and $\omega_M$ of the velocity controller and the mechanical system, respectively; and a damping factor $\zeta$. As will be seen from the block diagrams, the closed loop system includes mechanical elements in its closed loop and hence is capable of ultimately correcting a pitch error and a torsional error of the ball screw 31, permitting position control with higher accuracy than the semi-closed loop system. Therefore, the closed loop system has widely been used with a boring lathe, milling machine or machining center requiring high accuracy.

In relation to the block diagrams, the maximum value Kmax of the position loop gain K at which the closed loop is stable and at which the movement of the moving table 11 does not become oscillatory is, in the case of the closed loop system, determined by the smaller one of the break angular frequencies $\omega_V$ and $\omega_M$ of the transfer functions of the velocity controller and the mechanical system, as expressed by the following equation (1), whereas in the case of the semi-closed loop system, it is determined by the break angular frequency $\omega_V$ of the transfer function of the velocity controller, as expressed by the following equation (2):

$$K\max = (1/n) \times M\!in(\omega_V, \omega_M) \quad (1)$$

$$K\max = \omega_V/n \quad (2)$$

where n is approximately equal to 5. In the case of the closed loop system, if $\omega_M >> \omega_V$, no problem occurs; but when $\omega_M < \omega_V$, the maximum value Kmax of the position loop gain becomes smaller than that in the semi-closed system. Consequently, the closed loop system is inferior to the semi-closed loop system in terms of follow-up error, acceleration-deceleration distance and servo rigidity. In general, the break angular frequency $\omega_M$ of the transfer function of the mechanical system is given by $$\omega_M = \sqrt{\frac{K_L}{J_L}} \quad (3)$$

where $K_L$ is the rigidity of the mechanical system including the reduction gear and the ball screw and $J_L$ is a load inertia. Accordingly, in the case where the rigidity $K_L$ of the mechanical system is small and the load inertia $J_L$ is large, for example, as in the case of a turntable of a large-sized machining center, the break angular frequency $f_M(=\omega_M/2\pi)$ of the transfer function of the mechanical system, for example, may sometimes become 10 Hz or so, and the position loop gain K that can be used becomes small which makes stable and accurate position control difficult.

In a numerical-controlled machine tool of the closed loop system, a nonlinear element of the mechanical system, for instance, backlash of a gear or nonlinear friction of a sliding surface enters into the closed loop, so that the movement of the moving table 11 is subjected to the influence of such a nonlinear element.

FIGS. 5A, 5B, 6A and 6B are graphs showing how the movement y of the moving table 11 and the position error variable R vary in dependence on whether the nonlinear element, for example, backlash having a magnitude D, occurs or not in the case of applying, as the commanded positional information P, a ramp input bearing the following relationship:

$$P = F \times t \quad (4)$$

where F is a feedrate and t is time. When no backlash occurs, the movement y of the moving table 11 follows up the input P only with an error corresponding to a steady velocity error variable $\epsilon_D$ ($\epsilon_D \propto F/K$), as depicted, for example, in FIG. 5A, and the position error variable R in such a case is as shown in FIG. 5B. When the backlash occurs, the movement y of the moving table 11 follows up the input P with an error $F \times t_D$, where $t_D$ is the time in which the backlash occurs, corresponding to the magnitude D of the backlash in addition to the steady velocity error variable $\epsilon_D$, as shown in FIG. 6A, and the position error variable R in this case is as depicted in FIG. 6B. In this way, when the backlash occurs, the follow-up error increases as compared with the case of no backlash occurring.

In continuous cutting control adopted, for example, in an NC milling machine, NC lathe and so forth, when backlash acts on one of two simultaneously driven axes, for example, the X axis, with no backlash on the Y axis, even if the gain characteristics of the both axes are linear and equal to each other, the movement y of the moving table 11 gets out of its commanded locus L to introduce the corresponding machining error, as shown in FIG. 7. Such a machining error is also caused by nonlinear elements other than the backlash.

As described above, the conventional closed-loop type position control system for the numerical-controlled machine tool has the defect that a machining error is produced by the nonlinear elements of the mechanical system; furthermore, when the resonance frequency of the mechanical system, that is, the break angular frequency $f_M$ of the transfer function of the mechanical system, then the magnitude of the position loop gain that can be assumed within its stable region is limited, which results in the defect of a severe limitation on the position control accuracy and stability.

SUMMARY OF THE INVENTION

An object of this invention is to provide a position control system for numerical-controlled machine tools which permits position control with high accuracy.

Another object of this invention is to provide a position control system for numerical-controlled machine tools which is adapted so that even in the case of feeding back detected positional information from a moving table, a large position loop gain can be obtained to ensure highly accurate position control and high-speed positioning operation.

Another object of this invention is to provide a position control system for numerical-controlled machine tools which reduces machining errors due to nonlinear elements of the mechanical system, thereby to provide for enhanced accuracy in machining operation.

Yet another object of this invention is to provide a numerical-controlled machine tool control characteristic detecting system in which a closed loop type numerical-controlled machine tool is equipped with a function for detecting the control characteristic of the machine tool itself, whereby the transfer function of a closed loop can be obtained economically and easily without involving the use of a servo analyzer or a like measuring instrument, thereby to facilitate improvement of the control characteristic of the numerical-controlled machine tool.

Briefly stated, according to the present invention, in the closed loop type numerical-controlled machine tool in which position control of a mechanical moving part is performed in accordance with a position error variable obtained by making a comparison between commanded positional information and detected positional information from a position detector mounted on the mechanical moving part, deteriorated performance of the position control operation, which results from the inclusion of the mechanical moving part in the closed loop of the position control system, is improved by correcting means built into the numerical-controlled machine tool. The correcting means is provided with a position control error compensator which utilizes a processor for computing the characteristic response of the mechanical system including the mechanical moving part, or a simulator for simulating the movement of the mechanical moving part, in the case of no non-linear element being included in the simulation of the mechanical system of the numerical-controlled machine tool, and the position error variable or the position loop gain of the closed loop is varied with the difference between the simulator output and the detected positional information.

BRIEF DESCRIPTION OF THE DRAWINGS

FIGS. 1 and 2 are diagrams respectively illustrating the arrangements of numerical-controlled machine tools embodying conventional position control systems;

DESCRIPTION OF THE PREFERRED EMBODIMENTS

Figure 8:
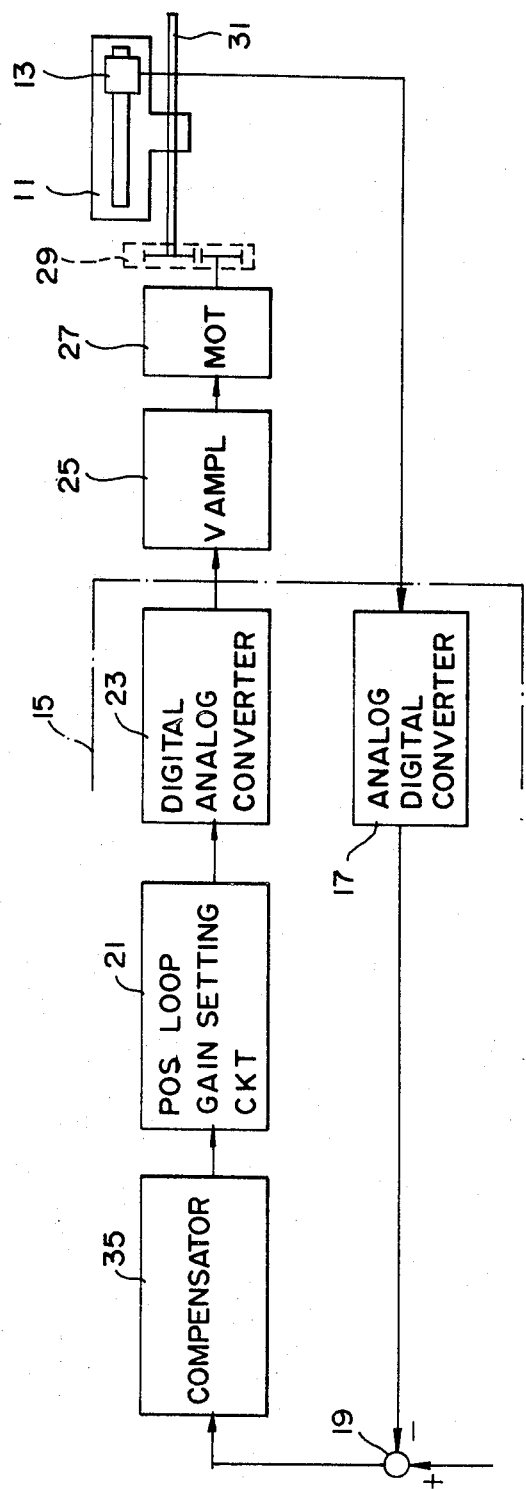
FIG. 8 is a diagram illustrating, by way of example, the arrangement of a numerical-controlled machine tool embodying this invention.
Figure 9:
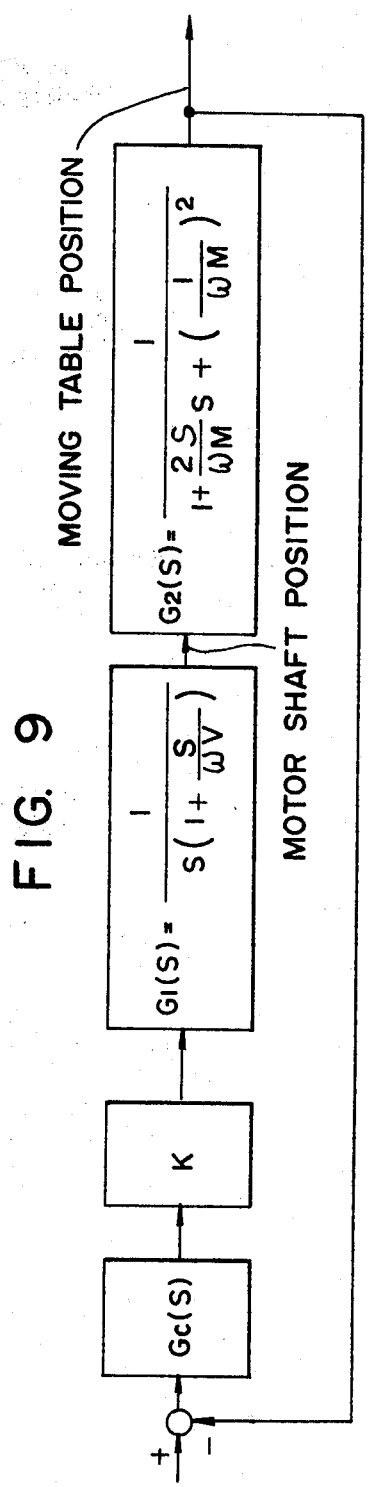
FIGS. 9 and 10 show in block form the arrangement of FIG. 8.

In FIG. 8 there is illustrated, by way of example, an arrangement of the numerical-controlled machine tool embodying the present invention and parts corresponding to those in FIG. 1 are identified by the same reference numerals. Reference numeral 35 indicates a position control error compensator. FIG. 9 shows in block form the arrangement of FIG. 8, indicating the transfer function $G_C(s)$ of the compensator 35, the position loop gain K, and the transfer functions $G_1(s)$ and $G_2(s)$ of the velocity controller and the mechanical system, respectively.

Figure 10:
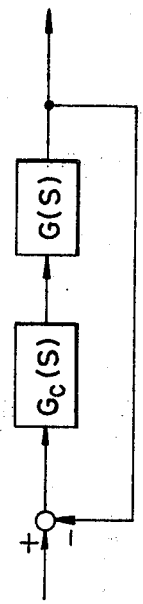

In the present invention, the compensator 35 is provided in the closed loop for stabilizing it, as shown in FIG. 8. Now, assuming that $$G(s) = K \times G_1(s) \times G_2(s) \qquad (5)$$

then the block diagram of FIG. 9 becomes such as shown in FIG. 10, and the operation of the system is determined by the following composite transfer function:

$$H(s) = G_C(s) \times G(s) \qquad (6)$$

Therefore, the maximum value Kmax of the position loop gain K for which the movement of the moving table 11 does not become oscillatory is given by the break angular frequency $\omega_0$ of the composite transfer function H(s) as follows:

$$K\max = \omega_0/n \tag{7}$$

where n is approximately equal to 5. Accordingly, by constituting the composite transfer function H(s) in such a manner that the break angular frequency $\omega_0$ is large, the maximum value Kmax can be selected large, thus enhancing the accuracy and stability of the position control. In the present invention, the compensator 35 is so formed as to achieve such an object. As a conventional method for constituting the compensator, a phase lag compensation and a phase lead compensation are known. In the phase lag compensation, a phase lag in the low-frequency region may exceed $-180°$ in some cases, leading to the defect that in the case of a nonlinear element being included in the closed loop, the system sometimes becomes unstable. In the phase lead compensation, the pole of the transfer function G(s) is to be cancelled by the root of a phase lead element, but in general, the pole is not preknown and invariable, so that the characteristic in the neighborhood of the pole of the transfer function G(s) cannot be sufficiently compensated. In the present invention, the above-said object is achieved by using, instead of such a simple-structured compensator, an advanced compensator utilizing the operating function of a processor in the numerical control equipment. A detailed description will hereinafter be given of the construction of the compensator 35 in the present embodiment.

In the case of a mechanical system in which the break angular frequency $\omega_M$ of its transfer function is 20 rad/s and the damping factor $\zeta$ is 0.3, if a transistor servo is employed in the velocity controller, the break angular frequency $\omega_V$ of the transfer function can be made, for example, about 500 rad/s; therefore, it is considered that $\omega_M >> \omega_V$, and the transfer function G(s) can be approximated by neglecting the angular frequency $\omega_V$ as follows:

$$G'(s) = \frac{K}{s} \times \frac{1}{1 + \frac{2\zeta}{\omega_M}s + \left(\frac{s}{\omega_M}\right)^2} \tag{8}$$

Figure 11:
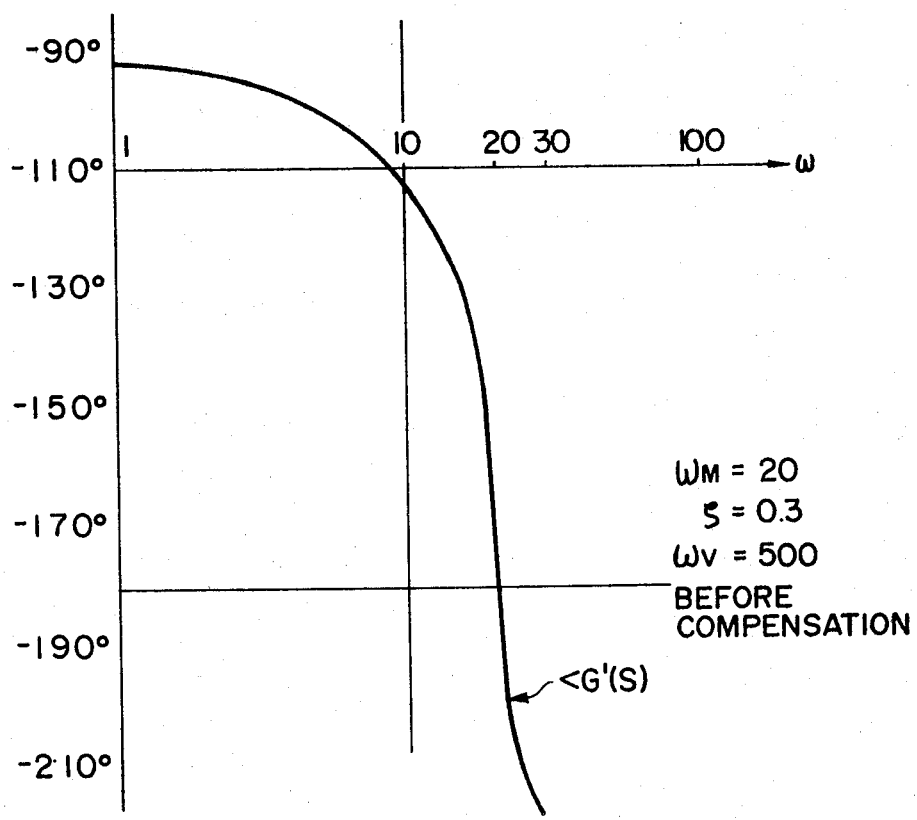
FIGS. 11 and 12 are graphs showing the characteristics of the machine tool depicted in FIG. 8.

In the case of no compensation being made in this state, the phase characteristic of the transfer function G'(s) is such as shown in FIG. 11. If a phase margin of more than 60° is to be secured, the maximum value Kmax of the position loop gain K which can be achieved is less than 10 sec$^{-1}$. Then, the compensator 35 is introduced.

Generally, it is known as the dynamic compensation of J. B. Pearson that the characteristic root of the transfer function $G_C(s) \times G'(s)$ of the compensated system can be designated at will if a second-order transfer function $G_C(s)$ such as given in the following equation is formed with respect to the third-order transfer function G'(s).

$$G_C(s) = \frac{b_2 s^2 + b_1 s + b_0}{s^2 + a_1 s + a_0} \tag{9}$$

If such a second-order transfer function $G_C(s)$ is assumed, then the compensated system comes to have a fifth-order transfer function $G_C(s) \times G'(s)$; consequently, if its characteristic roots are selected to be, for example, $-\omega_0, -4\omega_0, -4\omega_0, -4\omega_M, -4\omega_M$ so that the system is stable, its characteristic equation is as follows:

$$1 + G_C(s) \times G'(s) = (s+\omega_0)(s+4\omega_0)^2(s+4\omega_M)^2 \tag{10}$$

From the equation (10), the coefficients $a_0, a_1, b_0, b_1$ and $b_2$ of the transfer function $G_C(s)$ in the equation (9) are determined by a simple algebraic equation, so that the transfer function $G_C(s)$ of the compensator 35 is determined completely, and the composite transfer function $H(s) = G_C(s) \times G(s)$ after compensation is given by the following equation:

$$G_C(s) \times G(s) = \frac{b_2 s^2 + b_1 s + b_0}{s^2 + a_1 s + a_0} \times \frac{K}{s\left(1 + \frac{\zeta}{\omega_V}\right)} \times \frac{1}{1 + \frac{2\zeta}{\omega_M}s + \left(\frac{s}{\omega_M}\right)^2} \tag{11}$$

Figure 12:
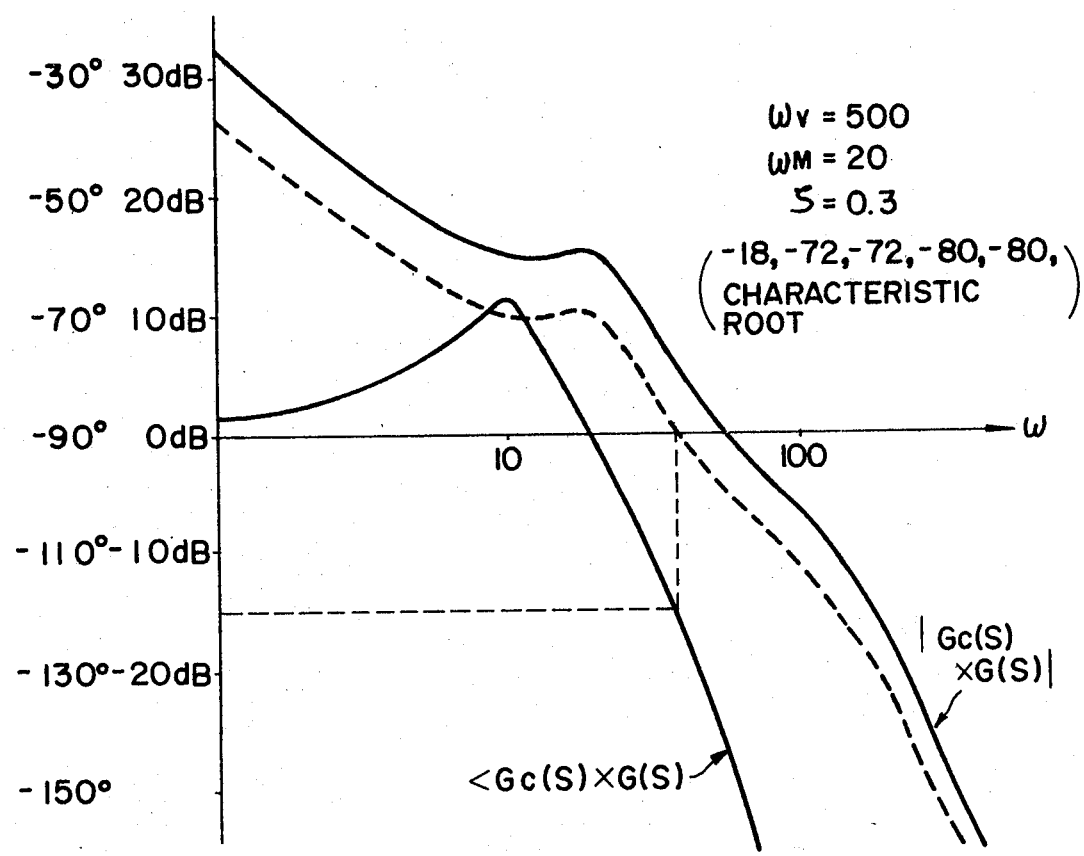

For instance, when the compensator is formed with the characteristic root $\omega_0$ selected to be 18 rad/sec, the gain and phase of the transfer function $G_C(s) \times G(s)$ of the compensated system are such, for example, as shown in the Bode diagram of FIG. 12. In FIG. 12, a steady gain is at about 40 rad/sec, but in the case of adjusting the gain as indicated by the broken line so that the phase margin is about 60°, the feasible position loop gain is at about 20 rad/sec, which is larger than the gain before compensation; thus, a stable operation can be expected. In the case of requiring a larger loop gain, the compensator is designed with the value of the characteristic root $\omega_0$ in the equation (10) selected larger than 18 rad/sec, for example, 30 rad/sec and with the characteristic roots after compensation set to $-\omega_0, -4\omega_0, -4\omega_0, -8\omega_M, -8\omega_M$.

Once the coefficients of the compensator 35 are thus determined, the compensator 35 can be implemented using a processor in the following manner.

Changing the equation (9), it follows that $$G_C(s) = b_2 + \frac{(b_1 - b_2 a_1)s + (b_0 - b_2 a_0)}{s^2 + a_1 s + a_0} \tag{12}$$

Figure 13:
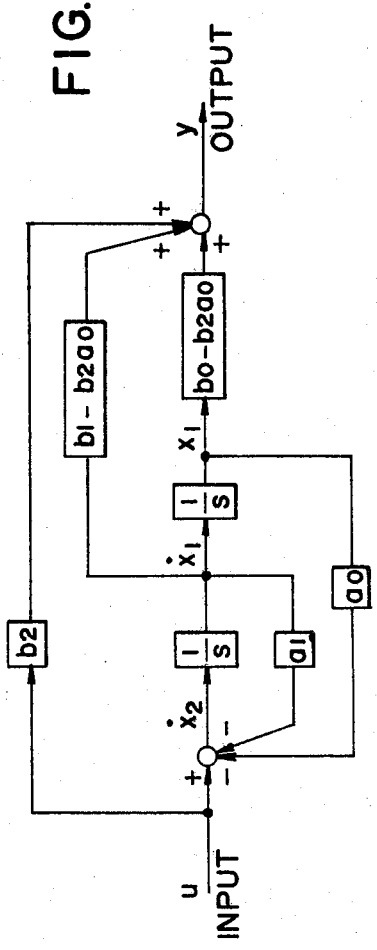
FIG. 13 is a block diagram illustrating a position control error compensator for use in this invention.

Generally, the state equation of the least order of the system having such a transfer function is expressed, for example, by the following differential equation, and the circuit arrangement in such a case is such as shown in FIG. 13.

$$\begin{cases} \dot{x} = \begin{bmatrix} 0 & 1 \\ -a_0 & -a_1 \end{bmatrix} x + \begin{bmatrix} 0 \\ 1 \end{bmatrix} u \\ y = \begin{bmatrix} b_0 - b_2 a_0 \\ b_1 - b_2 a_1 \end{bmatrix} x + b_2 u \end{cases} \tag{13}$$

where $$\dot{x} = \frac{d}{dt}x, \quad x = \begin{bmatrix} x_1 \\ x_2 \end{bmatrix},$$

and $x_1$ and $x_2$ being state variables.

Since the equation (13) is for a continuous system, it is transformed into the following difference equation for processing by the processor.

$$\begin{cases} x(k+1) = \phi(T) \cdot x(k) + h(T)u(k) \\ y(k+1) = \begin{bmatrix} b_0 - b_2 a_0 \\ b_1 - b_2 a_1 \end{bmatrix} \cdot x(k+1) + b_2 u(k+1) \end{cases} \quad (14)$$

where $\phi(T)$ and $h(T)$ are functions including $a_0$, $a_1$, $b_0$, $b_1$ and $b_2$.

Thus, deriving from the input $u(k)$ the state variables $x_1(k)$ and $x_2(k)$ in FIG. 13 by matrix calculation, the output $y(k)$ can be obtained using such values, so that if this processing is performed by a processor on an on-line basis simultaneously with machining control, the compensator 35 is obtained.

As described above, according to the present embodiment, in the numerical-controlled machine tool of the closed loop system in which the positional information is fed back directly from the mechanical moving part, there is provided in the closed loop a compensator which is formed in consideration of the characteristic of the mechanical system including the mechanical moving part, through utilization of the operating function of a processor. The closed loop is stabilized by the compensator to perform position control of the mechanical moving part. Since a large position loop gain is available, the position control can be achieved with high accuracy and the positioning operation can be effected at high speed.

Figure 14:
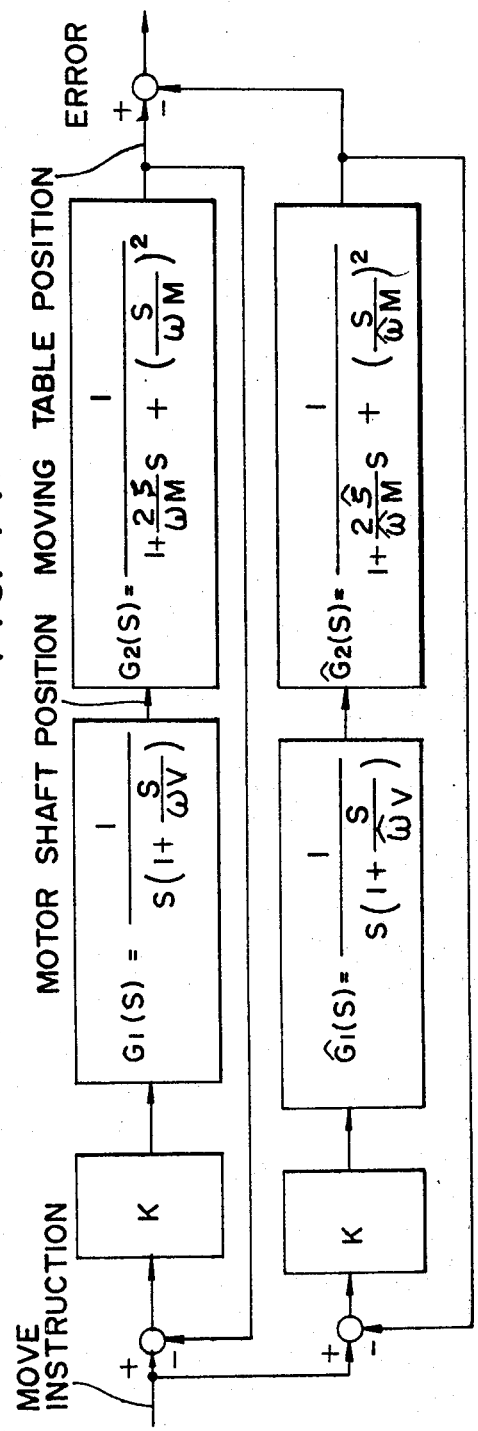
FIG. 14 is a block diagram explanatory of a control characteristic detecting system.

As will be appreciated from the above, the transfer function of the mechanical system must be preknown for designing the compensator 35 in the present embodiment. The transfer function of the mechanical system can also be obtained by the employment of a servo analyzer; but, for example, as shown in FIG. 14, by providing in parallel with an actual system a model system having a transfer function of the same type as that of an actual system and performing a simulation so that the output from the model may be equal to that from the actual system, the transfer function of the mechanical system can easily be presumed if the resonance angular frequencies $\hat{\omega}_V$ and $\hat{\omega}_M$ and the damping factor $\hat{\zeta}$ of the model are varied. A description will be given of the characteristic detecting system utilizing this method.

Figure 15:
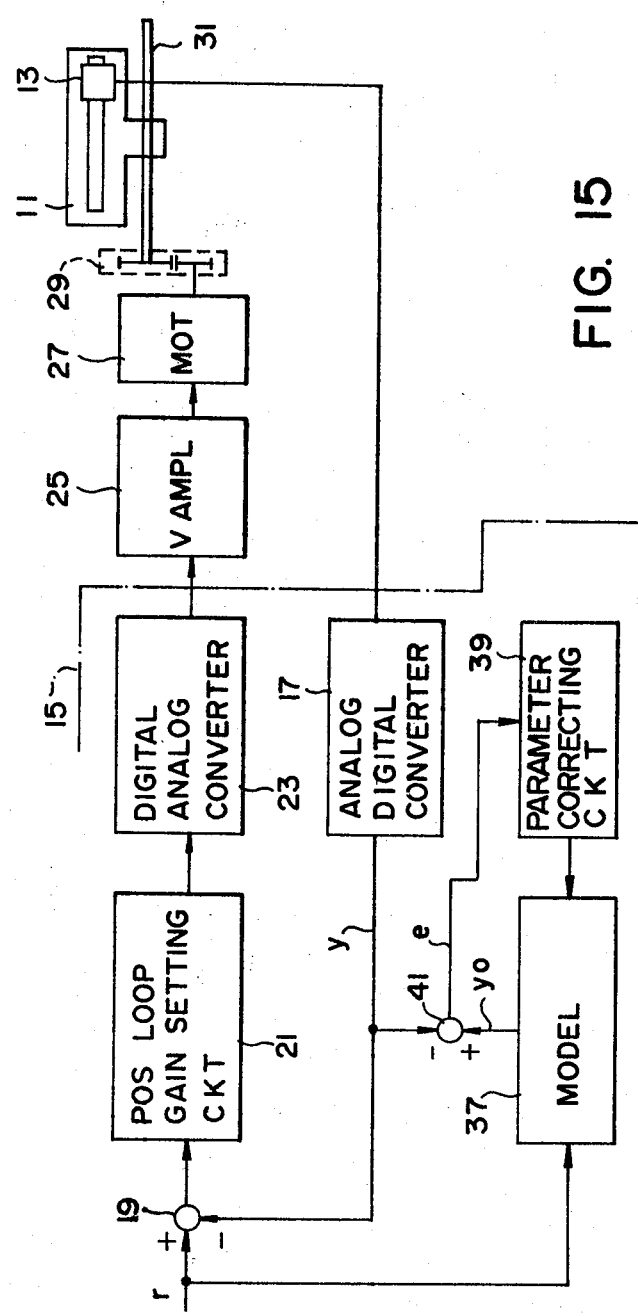
FIG. 15 is a diagram showing an apparatus embodying the control characteristic detecting system depicted in FIG. 14.

FIG. 15 shows the arrangement of the principal part of an example of the numerical-controlled machine tool embodying the characteristic detecting system. In FIG. 15, parts corresponding to those in FIG. 1 are identified by the same reference numerals, and further indicated is a model system 37, a parameter correcting circuit 39 and an adder 41. In the numerical-controlled machine tool of the closed loop system in which the detected positional information from the mechanical moving part 11 is negatively fed back, the model arrangement 37 for simulating the characteristic of the control system, that is, the transfer function of the closed loop and the parameter correcting circuit 39 for correcting parameters of the model arrangement 37 are provided in the position controller 15 through utilization of a processor. The commanded positional information is applied to both the actual control system and the model system 37, and the parameters of the model system 37 are corrected by the parameter correcting circuit 39 in such a manner as to minimize the difference between the outputs from the actual control system and the model system 37; and the characteristic of the model system 37 in the state that the output difference is minimized is used as the characteristic of the actual control system.

In general, the transfer function of the closed loop in the numerical-controlled machine tool is seldom unknown, and in many cases, the order of the transfer function can be presupposed and can generally be expressed by such a third-order pulse transfer function G(Z) as given by the following equation which is suitable for the actual processing by a processor.

$$G(Z) = \frac{\beta_2 Z^{-2} + \beta_1 Z^{-1} + \beta_0}{Z^{-3} + \alpha_2 Z^{-2} + \alpha_1 Z^{-1} + \alpha_0} \quad (15)$$

where $\alpha_i$ and $\beta_i$ (i=0, 1, 2) are constants inherent to the closed loop. Of course, when it is necessary to approximate the order with a pulse transfer function of a higher order, a higher-order pulse transfer function must be presumed, but for convenience of explanation, it is assumed that the characteristic of the closed loop is expressed by the pulse transfer function of the equation (15).

As the model system 37 for presuming such a transfer function G(Z), a model system which has a transfer function of the same order as the transfer function G(Z) and having unknown parameters $\hat{\alpha}_0$, $\hat{\alpha}_1$, $\hat{\alpha}_2$, $\hat{\beta}_0$, $\hat{\beta}_1$ and $\hat{\beta}_2$, shown by the following equation, is obtained by the employment of a processor.

$$G(Z; \hat{\alpha}_i, \hat{\beta}_i) = \frac{\hat{\beta}_2 Z^{-2} + \hat{\beta}_1 Z^{-1} + \hat{\beta}_0}{Z^{-3} + \hat{\alpha}_2 Z^{-2} + \hat{\alpha}_1 Z^{-1} + \hat{\alpha}_0} \quad (16)$$

When supplied with the same input r as that applied to the actual control system, the model system 37 provides an output $Y_0$ which is given by the following equation:

$$Y_0(n) = \hat{\beta}_2 r(n-1) + \hat{\beta}_1 r(n-2) + \hat{\beta}_0 r(n-3) - \hat{\alpha}_2 Y_0(n-1) - \hat{\alpha}_1 Y_0(n-2) - \hat{\alpha}_0 Y_0(n-3) \quad (17)$$

Accordingly, the output $Y_0$ of the model system 37 and the output y of the actual control system obtained with the position detector 13 are provided to the adder 41 to detect the difference e therebetween, which difference e is applied to the parameter correcting circuit 39.

The parameter correcting circuit 39 is to correct the parameters $\hat{\alpha}_i$ and $\hat{\beta}_i$ (i=0, 1, 2) of the model system 37 in a manner to minimize the output difference e, as described previously, and for such correction, a performance criterion J such, for example, as given by the following equation is introduced, whereby the parameters $\hat{\alpha}_i$ and $\hat{\beta}_i$ are evaluated.

$$\begin{aligned} J(\hat{\alpha}_i, \hat{\beta}_i) &= \Sigma\{e(k)\}^2 \quad (18) \\ &= \Sigma\{y_0(k) - y(k)\}^2 \\ &= \Sigma\{\hat{\beta}_2 r(k-1) + \hat{\beta}_1 r(k-2) + \hat{\beta}_0 r(k-3) - \\ &\quad \hat{\alpha}_2 y_0(k-1) - \hat{\alpha}_1 y_0(k-2) - \hat{\alpha}_0 y_0(k-3) - y(k)\}^2 \end{aligned}$$

Figure 16A:
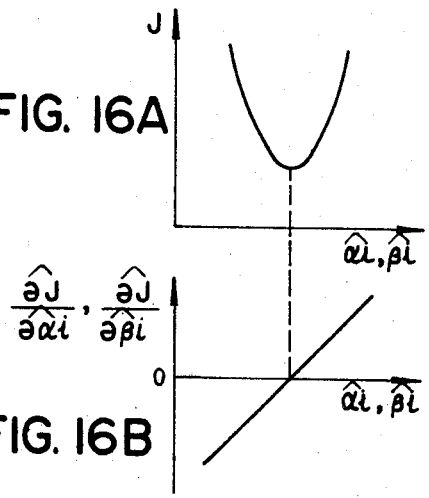
FIGS. 16A and B show graphs explanatory of the operation of the equipment depicted in FIG. 15.
Figure 16B:
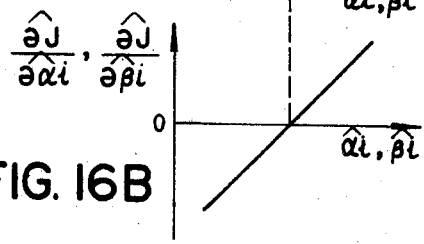

That is, the performance criterion $J(\hat{\alpha}_i, \hat{\beta}_i)$ has such a characteristic curve as shown in FIG. 16A which projects downwardly with respect to the parameters $\hat{\alpha}_i$ and $\hat{\beta}_i$, and its partial differential coefficients $\partial J/\partial \hat{\alpha}_i$ and $\partial J/\partial \hat{\beta}_i$ become such as depicted in FIG. 16B. Accordingly, by changing the parameters $\hat{\alpha}_i$ and $\hat{\beta}_i$ so that $\partial J/\partial \hat{\alpha}_i$ and $\partial J/\partial \hat{\beta}_i$ are reduced to zero, in accordance with the following relationships:

$$\Delta \hat{\alpha}_i = -K' \times \frac{\partial J}{\partial \hat{\alpha}_i} \quad (19)$$

$$\Delta \hat{\beta}_i = -K'' \times \frac{\partial J}{\partial \hat{\beta}_i} \quad (20)$$

the values of the parameters $\hat{\alpha}_i$ and $\hat{\beta}_i$ for which the performance criterion J is minimized can easily be obtained; thus, the model system 37 that minimizes the performance criterion J can be determined. The transfer function of the model system 37 thus determined is used as an optimum presumed value of the transfer function of the closed loop.

In this way, the model system 37 for simulating the transfer function of the closed loop and the parameter correcting circuit 39 for correcting the parameters of the model circuit 37 are constituted through utilization of the operating function of a processor; the parameters of the model system 37 are corrected by the parameter correcting circuit 39 so that the output $y_0$ of the model system 37 may approximately be equal to the output y of the actual control system; and the final value derived from the model system 37 is used as a presumed value of the transfer function of the actual control system. As the processor, use can be made of a processor which performs, for example, ordinary machining control; hence, the transfer function can be obtained economically. Furthermore, this method does not require any measuring equipment such as a servo analyzer, thus being unlike the prior art, and, in addition, does not involve any troublesome operations for obtaining the transfer function, so that this method can easily be carried into practice in the course of the position control.

While the above description has been made in connection with the case of obtaining the characteristic of the closed loop type numerical-controlled machine tool, it is obvious that the characteristic of the semi-closed loop type numerical-controlled machine tool can similarly be obtained. For the evaluation of the parameters $\hat{\alpha}_i$ and $\hat{\beta}_i$ of the model system 37, use can also be made of a trial and error method, other than the above-described method.

Figure 17:
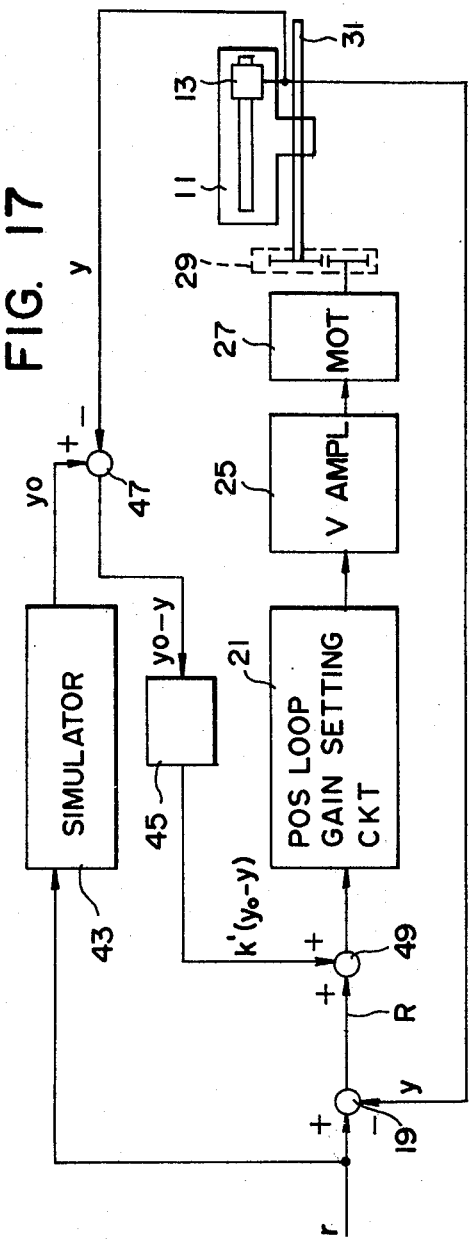
FIG. 17 is a diagram illustrating another example of the numerical-controlled machine tool embodying this invention.

FIG. 17 illustrates the arrangement of the principal part of another example of the numerical-controlled machine tool embodying this invention, and parts corresponding to those in FIG. 1 are marked with the same reference numerals. Also shown are a simulator 43; a proportional constant setting circuit 45; and adders 47 and 49. The simulator 43 receives the commanded positional information r and simulates the movement of the moving table 11 in the case of no nonlinear element being included in the mechanical system of the numerical-controlled machine tool. This simulator is constituted, for example, utilizing the operating function of a processor. The simulated output $y_0$ is applied, in the polarity indicated in FIG. 17, to the adder 47, wherein there is obtained a difference $y_0 - y$ between the simulated output $y_0$ and the actual movement y of the moving table 11 available from the position detector 13. The difference $y_0 - y$ is provided to the proportional constant setting circuit 45, wherein it is multiplied by a preset proportional constant K', and the multiplied output $K' \times (y_0 - y)$ is applied to the adder 49 for addition as a correction amount for the nonlinear element to the position error variable R.

Figure 3:
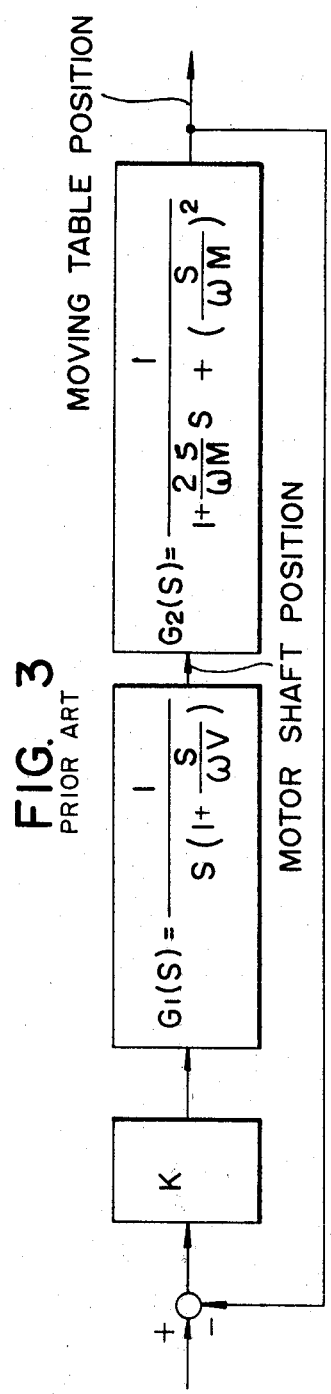
FIGS. 3 and 4 show in block form the arrangements of FIGS. 1 and 2, respectively.
Figure 4:
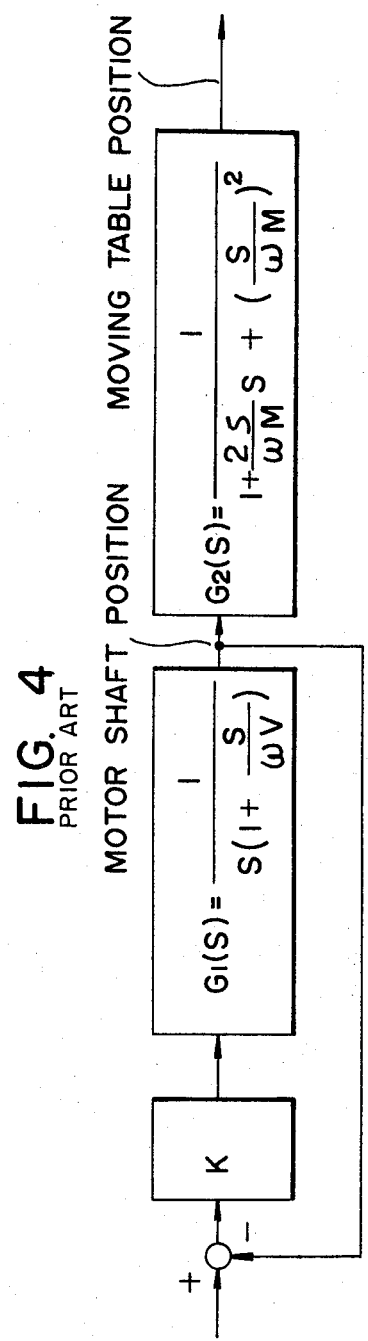
Figure 7:
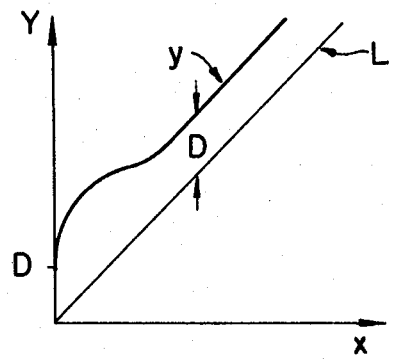
Figure 5A:
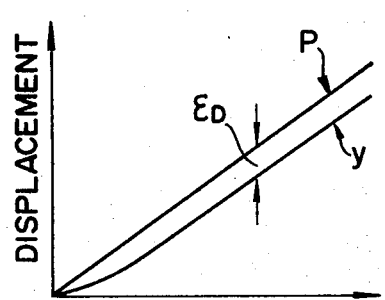
FIGS. 5A, 5B, 6A, 6B, and to 7 are explanatory of the operation of the conventional position control systems.
Figure 5B:
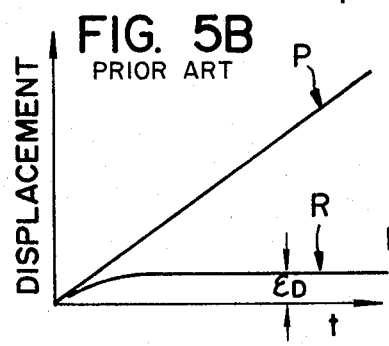
Figure 6A:
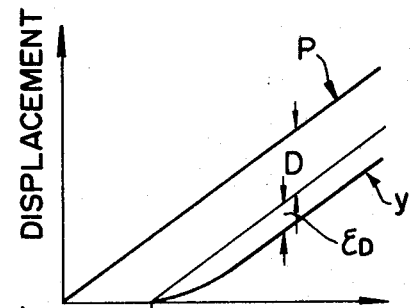
Figure 6B:
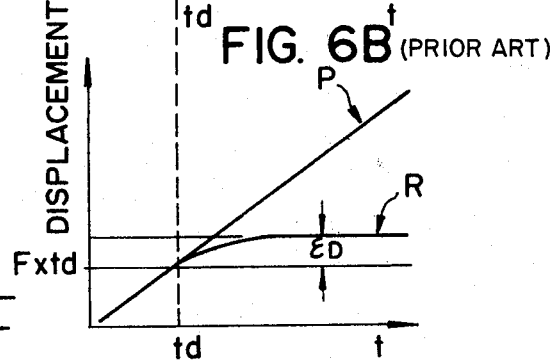
Figure 18:
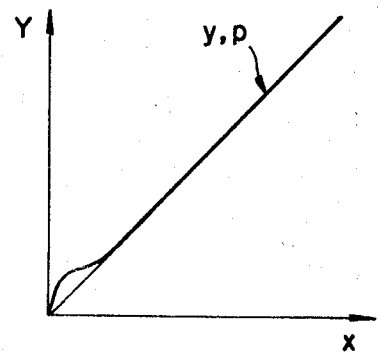
FIG. 18 is a graph explanatory of the operation of the machine tool shown in FIG. 17.

The output $y_0$ from the simulator 43 and the actual movement y of the mechanical moving part, that is, the moving table 11 coincide with each other when the latter is not affected by the nonlinear element, and in this case, no correction takes place. When the movement y of the moving table 11 is subjected to the influence of the nonlinear element, a follow-up error due to the nonlinear element occurs as the difference between the outputs $y_0$ and y. The correction amount $K' \times (y_0 - y)$ proportional to the difference is added to the position error variable R, and the velocity amplifier 25 controls the driving of the motor 27 using the added amount as a new position error variable, thereby effecting the correction corresponding to the follow-up error. As a consequence, the follow-up error due to the nonlinear element is corrected immediately. FIG. 18 is a graph, similar to FIG. 7, showing the effect of the present embodiment in the state in which backlash acts only on the X axis with no backlash on the Y axis in the continuous cutting control. As depicted in FIG. 18, the actual movement y of the moving table 11 accurately follows a desired locus P except its initial deviation therefrom. The initial deviation can also be reduced by adjusting the correction gain K'. Such an effect is also naturally produced with respect to nonlinear friction of the sliding surface of the moving table 11, for instance.

As described above, according to the present embodiment, in the closed loop type numerical-controlled machine tool, a simulator is provided which simulates the movement of the mechanical moving part in the case of no nonlinear element being included in the mechanical system of the machine tool, and the correction amount proportional to the difference between the simulator output and the actual movement of the mechanical moving part is added to a position error variable of the closed loop, whereby the follow-up error of the mechanical moving part due to the nonlinear element is corrected. For example, continuous cutting control or the like can be performed with high accuracy. Further, in the present invention, the difference between the simulator output $y_0$ and the position detector output y is applied to the main loop, and this also leads to the advantage that continuous correction can be achieved with simple hardware.

Figure 19:
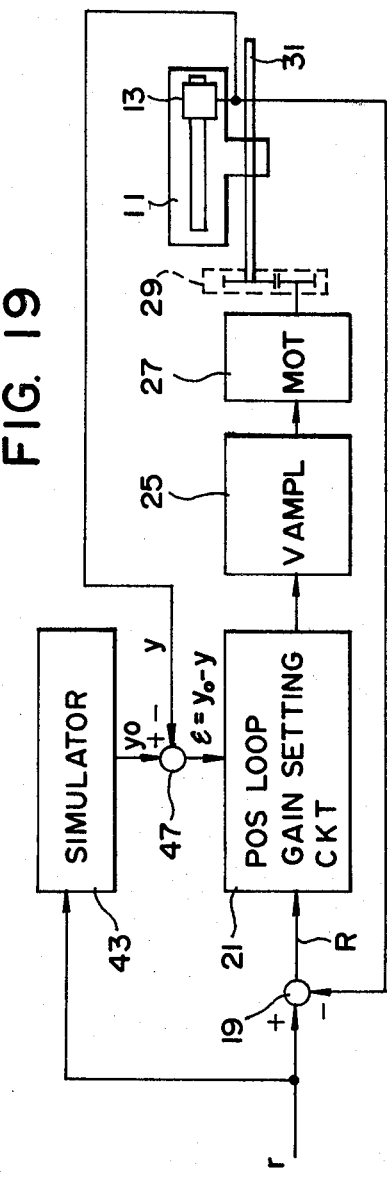
FIG. 19 is a diagram illustrating another example of the numerical-controlled machine tool embodying this invention.

FIG. 19 shows the arrangement of the principal part of another example of the numerical-controlled machine tool embodying this invention, and parts corresponding to those in FIG. 17 are identified by the same reference numerals. The simulator 43 is supplied with the commanded positional information r and simulates the movement of the moving table 11 in the case of no nonlinear element occurring in the mechanical system of the machine tool. The simulator 34 is implemented, for example, through utilization of the operating function of a processor, and the simulated output $y_0$ is applied to one input terminal of the adder 49. To the other input terminal of the adder 47 is provided the detected positional information y from the position detector 13 mounted on the moving table 11. In the adder 47, the difference $\epsilon$ between the simulated output $y_0$ and the actual movement y of the moving table 11 detected by the position detector 13 is obtained, and this difference $\epsilon$ is supplied to the position loop gain setting circuit 21.

The position loop gain setting circuit 21 is so designed that, for example, when the difference $\epsilon$ assumes the following value with respect to a permissible error range $\delta_1$:

$$|\epsilon| \leq \delta_1 \quad (21)$$

its position loop gain $K(\epsilon)$ is given a steady-stated value $K_0$ and that when the difference $\epsilon$ has the following value with respect to the error range $\delta_1$:

$$|\epsilon| > \delta_1 \qquad (22)$$

the position loop gain $K(\epsilon)$ is given a value $K_1$ larger than the steady-state value $K_0$.

Accordingly, when the moving table 11 is not affected by the nonlinear element of the mechanical system, the output $y_0$ from the simulator 43 and the actual movement y of the moving table 11 substantially coincide with each other to satisfy the equation (21); consequently, in this case, the position loop gain $K(\epsilon)$ has the steady-state value $K_0$ and the same position control as in the prior art is made. When the moving table 11 is affected by the nonlinear element and the difference $\epsilon$ between the output $y_0$ from the simulator 43 and the actual movement y of the moving table 11 becomes large to satisfy the equation (22), the position loop gain $K(\epsilon)$ is changed to the larger value $K_1$. The fact that the difference $\epsilon$ between the simulator output $y_0$ from the simulator 43 and the output y from the position detector 13 indicating the actual movement of the moving table 11 is large can be considered to mean that the position loop gain of the closed loop is decreased by the nonlinear element of the mechanical system; therefore, by increasing the position loop gain $K(\epsilon)$ larger than the steady-state value $K_0$, as described previously, the velocity amplifier 25 is caused to drive the motor 27 with a greater force, resulting in the time lag of the loop and accordingly the follow-up error being reduced.

Figure 20:
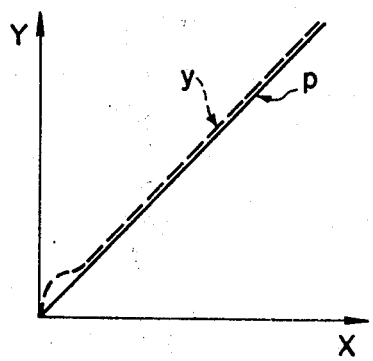
FIGS. 20 and 21 are graphs explanatory of the operation of the machine tool shown in FIG. 19.

FIG. 20 is a graph, similar to FIG. 7, showing the effect of the present invention produced in the case where only the X axis is greatly affected by the nonlinear element in the contouring control of the type where the X and Y axes are driven simultaneously. By the correction of the position loop gain corresponding to the X axis, the actual movement y of the moving table 11 can be made to follow accurately a desired locus P except its initial deviation therefrom, thereby reducing the machining error.

Figure 21:
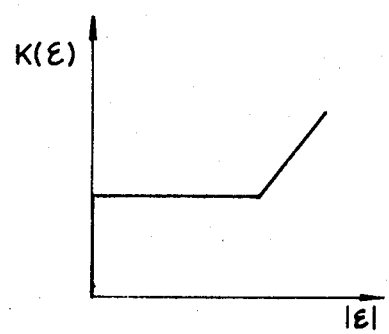

In the foregoing, the gain value of the position loop gain setting circuit is described to be variable between the two values $K_0$ and $K_1$, but this is solely for the purpose of simplification of the circuit arrangement, and various other modifications can be effected for reducing the initial deviation shown in FIG. 20. For example, three or more gain values can also be used, and further, it is possible to vary the position loop gain $K(\epsilon)$ continuously with respect to the difference $\epsilon$, for example, as shown in FIG. 21. In this case, however, it is necessary to implement the position loop gain setting circuit 21 by the operating function of a processor or to provide an additional circuit.

As described above, according to the present embodiment, in the closed loop type numerical-controlled machine tool, a simulator is provided for simulating the movement of the mechanical moving part in the case of no nonlinear element being included in the mechanical system of the machine tool; the difference between the simulator output and the actual movement of the mechanical moving part is detected; and in accordance with this difference, the position loop gain of the closed loop is varied. Since the position loop gain increases with an increase in the abovesaid difference, the follow-up error is decreased; accordingly, the contouring control and the like can be effected with high accuracy.

It will be apparent that many modifications and variations may be effected without departing from the scope of the novel concepts of this invention.

What is claimed is:

1. A position control system for a closed loop numerical-controlled machine tool in which the position of a mechanical moving part is controlled according to a position command, said system comprising
    a position detector mounted for detecting the position of the mechanical moving part,
    means for determining a positioning error signal by making a comparison between the position command and the detected position from said position detector, and
    correcting means for reducing the positioning error signal resulting from the inclusion of the mechanical moving part in the closed loop, said correcting means comprising a compensator included in the closed loop, said compensator comprising
    a processor,
    means for increasing the break angular frequency of said closed loop including the mechanical moving part, and for increasing the gain of the feedback of the closed loop in correspondence to the value of said positioning error signal in a stable region of the closed loop, said gain being usable for higher frequencies as a result of said increased break angular frequency of said closed loop including said compensator than for frequencies without said compensator.

2. The system of claim 1, wherein the correcting means comprises a simulator for simulating the linear portion of the response of the movement of the mechanical moving part, said simulator comprising means for adding to the positioning error a correction amount proportional to the difference between the output from the simulator and the detected positional information.

3. The system of claim 1, wherein the correcting means comprises a simulator for simulating the linear portion of the response of the movement of the mechanical moving part, said simulator comprising means for varying the gain of the feedback of the closed loop according to the difference between the output from the simulator and the detected positional information.

4. In a closed loop system for positioning a moving part according to a commanded position, the mechanical portion of said system including said moving parts having a nonlinear element in its transfer function, said closed loop including
    a first adder having as one input said commanded position,
    a gain setting circuit, having as input the output of said adder,
    a velocity amplifier having as input the output of said gain setting circuit,
    a motor having as input the output of said velocity amplifier,
    mechanical linkage connecting said motor to said moving part,
    a position detector mounted to detect the position of said moving part, and
    said first adder comprising means for forming said output to be the difference between said commanded position and said detected position, the improvement comprising:
    said closed loop comprising a compensator connected between said first adder and said gain setting circuit, said compensator comprising means for increasing the break angular frequency of the transfer function of said closed loop without said compensator by varying said input to said gain setting circuit in correspondence with said output of said first adder, said compensator acting to increase said break angular frequency of the closed loop including the compensator when the break angular frequency $\omega_M$ of the transfer function of said mechanical linkage and said moving part is lower than the break angular frequency $\omega_V$ of the transfer function of the combination of the velocity amplifier and the motor, as a result of selecting the parameters of the compensator so that the characteristic equation of the closed loop including said compensator has selected characteristic roots larger than at least the smallest root of the characteristic equation of the closed loop without said compensator.

5. The system of claim 4 comprising
the components of said system being selected so that $\omega_W < < \omega_V$, and so that the transfer function $G'(s)$ of the closed loop without said compensator may be approximated by a third order transfer function, said compensator comprising means for allowing the transfer function of said compensator $G_c(s)$ to be represented by a second order transfer function.

6. The system of claim 5, said compensator further comprising an equivalent circuit having seven branches and four nodes, each branch having a respective impedance, said equivalent circuit comprising
said first node comprising a first means for forming the difference between the output of said first adder and the sum of signals from the first and second branches, the output of said first means comprising one end of the sixth branch,
a second means for causing the output of said compensator to be the sum of the signals from the third, fourth and fifth branches,
said second node comprising said input of said first means, which is also said output of said first adder, being connected in common with the other end of said fifth branch,
the third node being a common connection point of the other ends of the first, fourth and sixth branches, and of one end of the seventh branch,
the fourth node being the common connection point of the other end of the second, third and seventh branches, and
the respective impedances of the first to seventh branches being respectively, $a_1$, $a_0$, $(b_0-b_2 a_0)$, $(b_1-b_2 a_0)$, $b_2$, $1/s$ and $1/s$,
whereby the constants $a_0$, $a_1$, $a_2$, $b_0$, $b_1$, $b_2$ are the coefficients of said third order transfer function $$G_c(s) = \frac{b_2 S^2 + b_1 S + b_0}{S^2 + a_1 S + a_0}$$

which are related to said selected roots of said transfer function of the closed loop by said characteristic equation.

7. In a closed loop system for positioning a moving part according to a commanded position, the mechanical portion of said closed loop including said moving part having a nonlinear element in its transfer function, said closed loop including
a first adder having as one input said commanded position,
a gain setting circuit, having as input the output of said first adder,
a velocity amplifier having as input the output of said gain setting circuit,
a motor having as input the output of said velocity amplifier,
mechanical linkage connecting said motor to said moving part,
a position detector mounted to detect the position of said moving part, and
said first adder comprising means for forming outputting the difference between said commanded position and said detected position, the improvement comprising:
a simulator having as input said commanded position and means for computing by means of a processor an output comprising a simulated value of the position of the moving part, said computing of said simulated value taking account only of the linear portions of the response function of said closed loop,
difference means for outputting a positioning error corresponding to the difference between said simulated value and said detected position, and
means for adjusting the gain of said gain setting circuit in correspondence to said positioning error.

8. The system of claim 7 comprising
a second adder located between the output of said first adder and said gain setting circuit, said second adder having as output to said gain setting circuit the addition of the output of said first adder with a second input to said second adder, and
a proportional constant setting circuit having as input said positioning error and as output said second input to said second adder, and comprising means for providing said output of said proportional constant setting circuit with a first value that is linearly proportional to said positioning error for absolute values of said positioning error that are less than a predetermined value, and for providing said output of said proportional constant setting circuit with a value that is greater than that corresponding to said first linearly proportional value to said positioning error for larger absolute values of said positioning error.

9. The system of claim 7, said positioning error being supplied directly to said gain setting circuit and said gain setting circuit comprising means for setting a first gain level when the absolute value of the positioning error is below a predetermined value, and means for setting a second and higher gain level for higher absolute values of the positioning error.

10. The closed loop type numerical-controlled machine tool system of claim 4, wherein the roots of said characteristic equation of said closed loop including said compensator are selected as $-\omega_0$, $-4\omega_0$, $-4\omega_0$, $-4\omega_M$, $-4\omega_M$, where $\omega_0$ is the break angular frequency of the portion of the closed loop including at least the compensator, the velocity amplifier, the motor and the mechanical linkage.

11. The closed loop type numerical-controlled machine tool system of claim 4, wherein the roots of said characteristic equation of said closed loop including said compensator are selected as $-\omega_0$, $-4\omega_0$, $-4\omega_0$, $-8\omega_M$, $-8\omega_M$, where $\omega_0$ is the break angular frequency of the portion of the closed loop including at least the compensator, the velocity amplifier, the motor and the mechanical linkage.

12. In a closed loop control system for positioning a moving part according to a commanded position, the mechanical portion of said closed loop including said moving part having a nonlinear element in its transfer function, said closed loop including
  a first adder having as one input said commanded position,
  a gain setting circuit, having as input the output of said first adder,
  a velocity amplifier having as input the output of said gain setting circuit,
  a motor having as input the output of said velocity amplifier,
  mechanical linkage connecting said motor to said moving part,
  a position detector mounted to detect the position of said moving part, and
  said first adder comprising means for forming said output to be the difference between said commanded position and said detected position, the improvement comprising:
  a simulator having as input said commanded position and means for computing by means of a processor an output comprising a simulated value of the position of the moving part, said computing of said simulated value accounting only for the linear portion of the response function of the portion of said closed loop including at least the velocity amplifier, motor and mechanical linkage, difference means for outputting a positioning error corresponding to the difference between said simulated value and said detected position to said gain setting circuit.

13. In a closed loop control system for positioning a moving part according to a commanded position, the mechanical portion of said closed loop including said moving part having a nonlinear element in its transfer function, said closed loop including
  a first adder having as one input said commanded position,
  a first gain setting circuit, having as input the output of said first adder,
  a velocity amplifier having as input the output of said first gain setting circuit,
  a motor having as input the output of said velocity amplifier,
  mechanical linkage connecting said motor to said moving part,
  a position detector mounted to detect the position of said moving part, and
  said first adder comprising means for forming said output to be the difference between said commanded position and said detected position, the improvement comprising:
  a simulator having as an input said commanded position and means for computing by means of a processor an output comprising a simulated value of the position of the moving part, and said computing of said simulated value accounting only for the linear portion of the open loop response function of said closed loop, difference means for outputting a positioning error corresponding to the difference between the simulated value and the detected position, a second gain setting circuit for receiving said difference between said simulated position value and said detected position and for outputting same in accord with a predetermined gain that is a predetermined increase in function of the absolute value of this latter difference, and further adder means for adding same to the difference from said first adder for input to said first gain setting circuit.

* * * * *

UNITED STATES PATENT AND TRADEMARK OFFICE
CERTIFICATE OF CORRECTION

PATENT NO. : 4,338,659

DATED : July 6, 1982

INVENTOR(S) : Mitsuo Kurakake

It is certified that error appears in the above-identified patent and that said Letters Patent is hereby corrected as shown below:

```
Column 1, line 48, delete ";".
Column 2, line 33, after "small" insert --,--.
Column 4, line 44, after "invention" insert --,--.
Column 5, line 38, ">>" should be --<<--.
Column 6, line 68, "being" should be --are--.
Column 7, line 53, after "39" insert --,--.
Column 10, line 54, "49" should be --47--.
Column 11, line 45, "." should be --,--.
Column 12, line 47, "parts" should be --part--.
```

Signed and Sealed this

Twenty-eighth Day of December 1982

[SEAL]

Attest:

Attesting Officer

GERALD J. MOSSINGHOFF

Commissioner of Patents and Trademarks